United States Patent [19]
Breitbart et al.

[11] Patent Number: 6,060,106
[45] Date of Patent: May 9, 2000

[54] OPAQUE LOW FAT SALAD DRESSING WITH AN IMPROVED MOUTHFEEL

[75] Inventors: Dennis Jay Breitbart, Kendall Park; Zoila Christina Aguilar, Ridgefield Park; Dominick Piccininni, Lodi, all of N.J.; Nanneke Joke De Fouw, Delft; Gerrit Daniel-Johannes Harcksen, Rotterdam, both of Netherlands

[73] Assignee: Lipton, a division of Conopco, Inc., Englewood Cliffs, N.J.

[21] Appl. No.: 08/991,308

[22] Filed: Dec. 16, 1997

Related U.S. Application Data

[60] Provisional application No. 60/033,776, Dec. 20, 1996.

[51] Int. Cl.[7] .................. A23L 1/035; A23L 1/0522; A23L 1/053; A23L 1/0532
[52] U.S. Cl. .................. 426/602; 426/573; 426/575; 426/578
[58] Field of Search .................. 426/601, 602, 426/573, 575, 578

[56] References Cited

U.S. PATENT DOCUMENTS

| | | | |
|---|---|---|---|
| 4,045,589 | 8/1977 | Petrowski | 426/609 |
| 4,479,971 | 10/1984 | Eng et al. | 426/330 |
| 4,790,998 | 12/1988 | Swartz | 426/585 |
| 4,977,252 | 12/1990 | Chiu | 536/102 |
| 5,082,684 | 1/1992 | Fung | 426/602 |
| 5,185,176 | 2/1993 | Chiu | 426/590 |
| 5,194,284 | 3/1993 | Chiu | 426/613 |
| 5,308,639 | 5/1994 | Fung | 426/603 |
| 5,322,702 | 6/1994 | Selinger et al. | 426/583 |

OTHER PUBLICATIONS

Glicksman, Martin, *Food Hydrocolloids*, vol. II, CRC Press, Inc., pp. 7–29.

A.M. Islam et al., "A review of recent developments on the regulatory, structural and functional aspects of gum arabic", *Food Hydrocolloids*, vol. II, No. 4, pp. 493–505, 1997, Oxford University Press.

Tan, Chee–Tak, "Beverage Flavor Emulsion—A Form of Emulsion Liquid Membrane Microencapsulation", *Food Flavors: Formation, Analysis and Packaging Influences* by Elsevier Science B.V. and edited by E. T. Contis et al. (1988).

Glicksman, Martin, *Food Hydrocolloids*, CRC Press, Inc., pp. 7–28.

Lowe, Belle, *Experimental Cookery*, second edition, John Wiley & Sons, pp. 277–286 (1937).

Potter 1973 Food Science AVI Publishing Co, Inc. Westport CT p 86–87.

Charley, Helen 1970 Food Science The Ronald Press Co New York p 253–256.

Boxer, Arabella 1974 Natures Harvest Henry Regnery Co, Chicago p 145.

Lowe, Belle 1937 Experimental Cookery 2nd edition John Wiley & Sons New York p 276–287.

Nudetch, Jean 1984 Weight Watchers New American Library p 79.

*Primary Examiner*—Carolyn Paden
*Attorney, Agent, or Firm*—James J. Farrell

[57] ABSTRACT

The current invention deals with a low fat opaque pourable dressing where the opacity is achieved by emulsification of the oil in a pre-emulsion and then adding and homogenizing the pre-emulsion to a water phase containing the balance of the dressing ingredients.

5 Claims, No Drawings

OPAQUE LOW FAT SALAD DRESSING WITH AN IMPROVED MOUTHFEEL

CROSS REFERENCES AND RELATED CASES

This application is based on provisional application, Ser. No. 60/033,776 filed Dec. 20, 1996.

FIELD OF THE INVENTION

This invention relates to low fat salad dressings and more particularly to opaque low fat salad dressings with improved fatty mouthfeel. A method of opacifying low fat salad dressings which contributes to an improved fatty mouthfeel is disclosed.

Continuing public demand has led to ongoing efforts to develop new food products with suitable taste and appearance. A product which does not have an expected appearance may not even be purchased from a grocery shelf. Even if purchased, a product which imparts an unusual visual perception may be unfavorably received, even if its other organoleptic properties are acceptable. Duplication of opacity, creaminess, and whiteness is especially important in products which try to mimic cream-like materials such as ranch type salad dressings.

Several approaches have been taken to achieve opacity to salad dressings. Initially there are two phase oil and water dressings which are mixed upon using and shaken to disperse one phase into the other. The instant dressing however is an oil containing non-separating dressing which is pourable as compared to mayonnaise which is spoonable and outside the scope of this invention. This type of non-separating dressing is a stable emulsion of oil in water. Thus a balance must be achieved among stable suspension of all of the ingredients, opacity, prevention of creaming of the ingredients and, once the emulsion is formed, prevention of separation into two or more phases.

Clouding agents have been used to achieve a certain translucency and palatability in selected types of beverages. U.S. Pat. No. 4,479,971 discloses the use of a selected glyceride fat in an aqueous dispersion or solution of gum Arabic. This is then added to a simulated fruit juice beverage to provide "cloud".

U.S. Pat. No. 4,790,998 also disclose a method of producing "cloud" in beverages simulating fruit juice.

U.S. Pat. No. 5,322,702 discloses a microgranular protein opacifying agent which may be used in salad dressings.

Titanium dioxide, which is a classic whitener for paints, can be a very effective opacifier and whitener for food products. Although considered safe in food products, titanium dioxide is an inorganic additive which by its very nature would be expected to find decreasing favor with greater public awareness of food additive contents.

Additionally, the brilliant whiteness of titanium dioxide is not necessarily desirable for mimicking the off-white creamy color desired for many food products. Resorting to artificial colors to correct this problem would be expected to compound the problem of public acceptance.

DESCRIPTION OF THE INVENTION

To meet the no artificial colors claim, an alternative to titanium dioxide in creamy dressings such as Ranch, creamy Italian and the like was needed. Commonly used ingredients such as Avicel (microcrystalline cellulose/carboxymethyl cellulose) were not applicable due to the desire to have a "better for you" ingredient declaration. Preliminary investigations indicated that producing an improved emulsion with the allowed oil would add opacity to the product. A prototype product without titanium dioxide was developed using Pre-emulsion technology.

The product was produced by first preparing a concentrated oil in water emulsion, referred to as a "Pre-emulsion"; an "Aqueous Phase", and a "Vegetable Phase". The aqueous components of the Pre-emulsion and the Aqueous Phase are pasteurized depending on the pH and the preservative system used, if any.

To maximize the opacity of the finished products, all the oil present in the dressing was added via the concentrated emulsion. The opacity of the Pre-emulsion was dependent on the oil droplet size. Best results were obtained when the Pre-emulsion was homogenized using a two stage piston homogenizer at about 2,500 to 10,000 psi in the first stage and about 500 psig in the second stage. A single stage homogenizer may also be used.

The Pre-emulsion and the aqueous phase are combined and homogenized in a high shear mixer to produce the finished creamy base. The final product is produced by blending in the vegetable phase.

A method for opacifying an oil in water type low fat salad dressing having about 3–10% oil is disclosed comprising:

| | |
|---|---|
| A. | forming an oil in water type pre-emulsion having an average particle size of about 0.1 microns to about 10 microns containing about 75% to 40% water; 5% to 20% bodying agent and about 20% to 40% oil by homogenizing the ingredients in a homogenizer at about 2500 psig to 10,000 psig; |
| B. | adding a sufficient amount of the pre-emulsion to a separately prepared aqueous phase containing about<br>40% to 65% water;<br>1% to 3% starch;<br>0.3% to 0.8% xanthan gum;<br>10% to 30% corn syrup;<br>0% to 5% dairy solids, e.g., yogurt;<br>0% to 5% spices;<br>6% to 10% vinegar;<br>1% to 2% salt. |
| C. | homogenizing the pre-emulsion and the water phase to form an emulsion having a hunter opacity of at least about 80 in the absence of titanium dioxide and with no more than a total of about 10% oil in the final dressing. |
| D. | adding the vegetable phase and mixing to form a final dressing. |

The amount of pre-emulsion to be added depends on the amount of oil desired in the final dressing and for example if 3% oil is desired in the final dressing 12% of the final product is pre-emulsion which in turn contains 25% oil. The possible range of pre-emulsion is about 7% to about 50% pre-emulsion to total dressing depending on the amount of oil desired. Thus if a 3% total oil is desired and the pre-emulsion contains about 40% oil, only 7.5% of the pre-emulsion must be added. If the total oil desired is 6% and the pre-emulsion contains about 20% oil then 30% of the pre-emulsion must be added. Accordingly for a final dressing containing about 3% to 10% oil the pre-emulsion preferably is formed from about 20% to 40% oil and added to the aqueous phase. The aqueous phase must have sufficient water to functionalize the ingredients.

The addition of oil to salad dressings in the form of concentrated emulsions has been found to add opacity and improved mouth coating to creamy Salad Dressings. The salad dressing is prepared by first incorporating the oil to be used in the salad dressing into a concentrated emulsion (called a Pre-emulsion). This emulsion contains oil, oil soluble ingredients, water, and Gum Arabic or an emulsifying starch which can be certain modified starches such as corn starch or the like, examples include National Starch and Chemical Co. Purity Gum 539 or National N-Creamer 46 or equivalent. An acidulant and preservatives can be added to the pre-emulsion phase if desired. The emulsion can be prepared using suitable equipment, typically a homogenizer. The resulting emulsion is of high quality and is used as an ingredient in the final salad dressing.

The aqueous phase of the salad dressing is prepared in known fashion and the above pre-emulsion is added to deliver at least about 3% fat to the final product, and the mixture is homogenized. The resulting product is more opaque than a comparable product made without the pre-emulsion. The product also has improved mouth coating feel when compared to a salad dressing made with a comparable oil level.

The product resulting from this process eliminates the need for Titanium Dioxide as an opacifier/whitener. Creamy low fat salad dressings such as Ranch without artificial colors offer a consumer benefit.

In addition, low fat products with improved mouthfeel offer the consumer the taste of higher fat without the calories associated with a higher fat level.

Pre-emulsion

The pre-emulsion is preferably formed with oil, starch or gum Arabic and water.

The type of oil is not critical to the invention and may be any of the usual vegetable oils used in salad dressing.

In this specification, unless otherwise indicated, the term "fat" and the term "oil", when used in a general sense, refer to edible fatty substances including natural or synthesized fats and oils consisting essentially of triglycerides such as, for example, safflower oil, cottonseed oil, soybean oil, sunflower oil, palm oil, palm kernel oil, cocoa butter, canola oil, coconut oil, and to non-toxic fatty materials having properties similar to triglycerides, which materials may be partially or totally indigestible, such as for example polyol fatty acid polyesters or Salatrim® a product of Nabisco. The terms fat and oil are used interchangeably, with the proviso that oil denotes a fat which is liquid at ambient temperatures. Single oils and fats or mixtures may be used.

In this specification the term "polyol fatty acid polyester" is intended to refer to any polyester or mixtures thereof, of which on an average more than 70% of the polyol hydroxyl groups have been esterified with fatty acids. In this regard by "indigestible" is meant that at least about 70% by weight of the material concerned is not digested by the human body.

Gum Arabic (gum acacia) is an item of commerce and is readily available. Purified versions such as emulgum® sold by Colloides Naturel, Inc.

Starch

The starch that may be used in the pre-emulsion is a starch derivative which provides a stable emulsion of the oil in water type. Many of these starches are available in commerce and have been described in the patent literature, for example in U.S. Pat. Nos. 5,185,176; 4,977,252; and 4,045,589.

Particle Size

The particle size of the pre-emulsion oil droplets is greater than 0.1 micron but less than macro globules with a particle size of 10 microns or higher. The appropriate range of the particles is thus about 0.1 to 10 microns. The size of the particles required to achieve good opacity is discussed on pages 52 to 54 in "Emulsions: Theory and Practice", an American Chemical Society Monograph published in 1957 by Reinhold Publishing Corporation, N.Y. Thus if the droplets or particles are too large two phases can be distinguished but if they are too small, for example, 0.05 microns or smaller a transparent micro-emulsion results. Accordingly, a balance must be achieved to result in appropriate opacity.

Total Composition

The low fat dressing compositions desirably comprise from about 40 to about 75 percent by weight moisture, from small amounts to about 50 percent carbohydrate, from about 0 to about 5 percent by weight protein and from about 3 to about 10 percent by weight of fat, as well as salt, flavoring agents and other food components.

The food dressing utilized in accordance with the present invention will generally contain sufficient acidifying agent to provide the aqueous component of the dressing vehicle with a pH of less than 4.0, and preferably in the range of from about 2.75 to about 3.75.

The sweetener used is typically maltodextrin with a DE of 9 to 15 or corn syrup or mixtures of these. However, other sweeteners such as sucrose, dextrose, fructose, corn syrup solids and synthetic sweeteners may also be utilized.

While any corn syrup including high DE syrups or high fructose corn syrups are appropriate, corn syrups having a DE of less than about 50 preferably 15 to 42 are a particularly desirable component of dressing formulations. Such corn syrup solids may be provided by acid, enzyme, or acid-enzyme hydrolysis of corn starch. The dextrose equivalent (DE) value may be calculated according to the formula $DE=100/(M_n/180.16)$ where $M_n$ is the number average molecular weight of the corn syrup solids.

A substantial proportion of 15–42 DE corn syrup solids may be provided in the pourable dressing products in order to provide maximum benefits. In this regard, the pourable dressing may desirably comprise from about 0 to about 30 weight percent, and preferably in the range of from about 5 to about 20 weight percent of such 15–42 DE corn syrup solids based on the total weight of the pourable dressing product. The low dextrose equivalent corn syrup solids are believed to provide the pourable dressing product with more pleasing fat-mimetic characteristics, and pleasing organoleptic characteristics.

Small amounts of any suitable emulsifying agent may be used in the salad dressing compositions of the invention. In this connection, egg yolk solids, protein, gum Arabic, carob bean gum, guar gum, gum karaya, gum tragacanth, carrageenan, pectin, propylene glycol esters of alginic acid, sodium carboxymethyl-cellulose, polysorbates and mixtures thereof may be used as emulsifying agents in accordance with conventional food dressing manufacturing practices.

Various other ingredients, such as spices and other flavoring agents, and preservatives such as sorbic acid (including salts thereof) are typically included in effective amounts.

The dressing vehicle may have an aqueous pH of about 4 or lower, preferably in the range of from about 2.75 to about 3.75. Any suitable edible acid or mixture of acids may be used to provide the desired level of acidity in the emulsified dressing, with suitable edible organic and inorganic acids including vinegar, lactic acid, citric acid, tartaric acid, fumaric acid, malic acid, phosphoric acid, hydrochloric acid, acetic acid and mixtures thereof. The amount utilized to achieve a desired pH will depend on a variety of factors known in the art including the buffering capacity of protein components of the dressing.

The pre-emulsion is prepared as follows:

Sufficient warm water is added to a mixer with mixing to disperse gum Arabic or starch as desired to form a dispersion.

The dispersion is mixed without high shear to avoid degradation of the colloid. Oil is added during mixing to make a coarse emulsion. The coarse emulsion is then homogenized in a colloid mill or homogenizer or high shear rotor stator device to emulsify the oil.

Preservatives, antioxidants and oil soluble ingredients can be added if desired.

A pre-emulsion is thus obtained.

The aqueous phase is then prepared in a mixer such as a Votator or a Lightnin mixer to disperse gums and solubilize ingredients.

The pre-emulsion is combined with the aqueous phase and the whole is homogenized. The vegetable phase if any is subsequently added.

Opacity

Opacity is measured on a Colorimeter. $TiO_2$ provides excellent opacity in a dressing on the order of 95–100 units. A full fat dressing containing about 15 to 50% fat or higher also gives good opacity expected to be 90 or better. Low fat dressings having less than about 10% fat however have opacities of about 73 to 78. If the novel pre-emulsion approach is employed opacities in the range of 85 or better can be easily obtained.

Having, generally described various aspects of the present invention, the invention will now be more particularly described with reference to the following specific Examples.

EXAMPLE 1

The dressing of the invention having the following ingredients is formed:

| INGREDIENT | TOTAL % | |
|---|---|---|
| PRE-EMULSION PHASE | | |
| Water | 9.51 | |
| Purity Gum 539 | 2.16 | Modified Starch |
| Canola Oil | 5.01 | 16.67 |
| AQUEOUS PHASE | | |
| Water | 24.63 | |
| Modified Starch | 2.40 | |
| Vinegar | 8.00 | |
| Xanthan Gum | 0.48 | |
| Corn Syrup 43 DE | 11.35 | |
| Non Fat Yogurt | 20.00 | |
| Maltodextrin 9-15 DE | 9.93 | |
| MSG | 0.45 | |
| Spices and Flavors | 3.15 | |
| Lemon Juice | 0.05 | |
| Sodium Chloride Granular | 1.90 | 82.64 |
| VEGETABLE PHASE | | |
| Parsley | 0.03 | |
| Black Pepper | 0.062 | |
| Xanthan Gum | 0.004 | |
| Vinegar | 0.60 | 0.70 |
| | TOTAL % | TOTAL % |
| | 100.0000 | 100.0000 |

EXAMPLE 2

Comparative: The following ingredients are used to form a comparative dressing.

| INGREDIENT | TOTAL % | |
|---|---|---|
| AQUEOUS PHASE | | |
| Water | 36.30 | |
| Modified Starch | 2.40 | |
| Vinegar | 8.00 | |
| Xanthan Gum | 0.48 | |

-continued

| INGREDIENT | TOTAL % | |
|---|---|---|
| Corn Syrup 43 DE | 11.35 | |
| Non Fat Yogurt | 20.00 | |
| Maltodextrin 9-15 DE | 9.93 | |
| MSG | 0.45 | |
| Titanium Dioxide Dispersion | 0.30 | |
| Spices and Flavors | 3.15 | |
| Lemon Juice | 0.05 | |
| Sodium Chloride Granular | 1.90 | 94.31 |
| VEGETABLE OIL PHASE | | |
| Canola Oil | 5.01 | 5.01 |
| VEGETABLE PHASE | | |
| Parsley | 0.03 | |
| Black Pepper | 0.062 | |
| Xanthan Gum | 0.004 | |
| Vinegar | 0.60 | 0.70 |
| | TOTAL % | TOTAL % |
| | 100.00 | 100.00 |

EXAMPLE 3

Comparative: The following ingredients are used to form a comparative dressing. No pre-emulsion is used and no $TiO_2$ is employed.

| INGREDIENT | TOTAL % | |
|---|---|---|
| AQUEOUS PHASE | | |
| Water | 36.60 | |
| Modified Starch | 2.40 | |
| Vinegar | 8.00 | |
| Xanthan Gum | 0.48 | |
| Corn Syrup 43 DE | 11.35 | |
| Non Fat Yogurt | 20.00 | |
| Maltodextrin 9-15 DE | 9.93 | |
| MSG | 0.45 | |
| Spices and Flavors | 3.15 | |
| Lemon Juice | 0.05 | |
| Sodium Chloride Granular | 1.90 | 94.31 |
| VEGETABLE OIL PHASE | | |
| Canola Oil | 5.01 | 5.01 |
| VEGETABLE PHASE | | |
| Parsley | 0.03 | |
| Black Pepper | 0.062 | |
| Xanthan Gum | 0.004 | |
| Vinegar | 0.60 | 0.70 |
| | TOTAL % | TOTAL % |
| | 100.00 | 100.00 |

Results

Opacity measurements result in the following:

| Opacity Measurements | |
|---|---|
| Product | Opacity (%) |
| Ranch Control - Example 3 | 73–78 |
| Ranch with Titanium Dioxide - Example 2 | 94 |
| Ranch with Pre-Emulsion Process - Example 1 | 85–88 |

-continued

| Opacity Measurements | |
|---|---|
| Product | Opacity (%) |
| Kraft Fat Free Ranch | 94 |
| Wishbone Fat Free Ranch | 96 |

Opacity Measurement

Opacity is measured on a Hunter Labscan 6000 Spectrocolorimeter. The percent opacity of the samples is calculated by taking two readings of the sample in a reflectance mode. One reading is taken with the sample backed by white and the other is taken with the sample backed with black. The differences in reflectance are then used to calculate the % opacity.

It is understood that the examples and embodiments described herein are for illustrative purposes only and that various modifications or changes in the light thereof will be suggested to persons skilled in the art and are to be included within the spirit and purview of this application and the scope of the appended claims.

What is claimed is:

1. A method for opacifying an oil in water type low fat salad dressing having about 3–10% oil comprising:
   A. forming an oil in water type pre-emulsion having an average particle size of about 0.1 microns to about 10 microns containing about 40% to 75% water; 5% to 20% of an emulsifier selected from the group consisting of gum arabic, emulsifying starch and mixtures thereof and about 20% to 40% oil, by homogenizing the ingredients in a homogenizer at about 2500 psig to 10,000 psig;
   B. adding a sufficient amount of the pre-emulsion to a separately prepared aqueous phase containing
      40% to 65% water;
      1% to 3% starch;
      0.3% to 0.8% xanthan gum;
      10% to 30% corn syrup;
      0% to 5% dairy solids,
      0% to 5% spices;
      6% to 10% vinegar;
      1% to 2% salt.
   C. homogenizing the pre-emulsion and the water phase to form a final emulsion dressing having a hunter opacity of at least 80 in the absence of titanium dioxide and with no more than a total of 10% oil in the final dressing.

2. A salad dressing, prepared by the process of claim 1, containing about 7% to 50% of the pre-emulsion of claim 1 as the sole opacifying agent and sole source of oil wherein said pre-emulsion is formed of an emulsion of water, starch and oil having a particle size of about 0.1 to 10 microns, wherein the total dressing has a particles size of pre-emulsion dispersed therein of 0.1 to 10 microns.

3. A salad dressing, prepared by the process of claim 1, containing up to 10% fat comprising:
   0.5%–4.5% starch;
   0.1%–0.6% of gum selected from the group consisting of xanthan gum, carrageenan gum, locust bean gum and guar
   0–0.3% of alginate derivatives selected from the group consisting of propylene glycol alginate; and sodium alginate;
   7%–50% pre-emulsion; containing 3 to 10% oil on the final dressing basis;
   0.1%–25% flavor cocktail consisting essentially of spice extractives, natural or artificial flavors;
   0%–to 3.5% acidulant;
   0%–30% sweetening agent;
   3%–10% oil;
   15%–80% water;
   said dressing having substantially identical organoleptic and functional properties as other dressings with higher fat content, and having been opacified by the pre-emulsion of claim 1 said pre-emulsion having been subjected to high shear forces during processing and about 70% of said pre-emulsion having a particle size of less than about 0.5 microns.

4. A dressing as defined in claim 3 having as the sole opacifying component a pre-emulsion.

5. A method as defined in claim 1 wherein said pre-emulsion is formed in a two stage piston homogenizer utilizing 2500 to 10,000 psig in the initial stage and about 500 psig in the second stage.

* * * * *